Patented Nov. 20, 1934

1,981,614

UNITED STATES PATENT OFFICE 1,981,614

METHOD FOR DERIVING LIQUID HYDROCARBONS FROM SOLID CARBONIZABLE MATERIALS

Georges Francis Michot-Dupont, Vincennes, France, assignor to "Physical Chemistry Research Cy," Wilmington, Del., a company No Drawing. Application February 7, 1931, Serial No. 514,324. In Belgium November 15, 1930

8 Claims. (Cl. 202—34)

The present invention relates to methods for extracting hydrocarbons from carbonaceous materials and, more particularly, from lignite.

One of the objects of the invention is to provide a method for eliminating sulphur from carbonaceous materials submitted to dry distillation.

Another object is to provide a method for extracting liquid hydrocarbons from carbonaceous materials.

Further objects will appear in the course of the detailed description now to be given.

The method may be carried out in the following manner: The lignite or other carbonaceous materials, which may contain as much as 8% or even more of sulphur is first broken into lumps of about nut size; a hundred kilograms of the lignite thus broken is then treated by sprinkling or otherwise with a solution containing a hundred grams of calcium acetate per liter, the total amount of calcium acetate being such as to provide one gram of this salt for each per cent of sulphur contained in one kilogram of the lignite i. e. 8 grams of calcium acetate per kilogram of lignite when the latter contains 8% sulphur; the mixture of lignite and calcium acetate is then charged into retorts capable of being operated at pressure of several centimeters (of water) below atmospheric pressure, the retorts being of the type generally employed in the gas making industry and fitted with appropriate condensing and distillate recovery apparatus; the retort is then gradually heated and, when the temperature thereof reaches about one hundred degrees centigrade, steam under low pressure (about 300 gr. per square centimeter, or about 4.3 pounds per square inch), is injected while maintaining the reduced pressure above referred to, inside the retort; the temperature of the reacting mass is then gradually raised to a low red heat (250° C. to 500° C.) so as to convert the lignite into coke, the injection of steam being continued as before.

It is desirable that the absorption units connected to the retort include an absorber containing what is known in the gas making industry as Laming's mixture which contains sawdust, iron sulphate, lime, etc., and which is particularly active in absorbing sulphur and its compounds.

If the amount of calcium acetate employed is sufficient, it is observed that the liquid distillate recovered by condensation is composed of an oil completely free of sulfurous odors and which on fractional distillation, yields a high percentage of low boiling hydrocarbons similar to gasoline, a certain percentage of kerosene, and a residual paraffine oil completely free of any odor suggesting sulphur.

It is, obviously, impossible to set forth, in the form of definite chemical equations, exactly what reactions occur during the heating of the lignite with calcium acetate. As indicating what the probable reactions are, it may be assumed that the calcium acetate, under the action of heat, is split into acetone and calcium carbonate. The calcium carbonate then loses carbon dioxide and is converted into quick lime which reacts with the sulphur in the lignite to form calcium sulphid. It is possible that the latter compound, under the action of heat and the accompanying carbon and steam, is converted into hydrogen sulphide and other sulphur-containing compounds which are either eliminated in the form of gas or remain in the coke. The acetone produced by the splitting of the calcium acetate, probably breaks down at retort temperatures to combine with the liquid and gaseous hydrocarbons emanating from the lignite to produce low-boiling distillates.

The invention is, obviously, not limited in its application to the use of lignite and calcium acetate as reacting materials. The lignite may, for example, be replaced by peat, bituminous schists, ordinary coal or other carbonaceous material. The calcium acetate may, similarly, be replaced by a mixture of lime and acetic acid, calcium butyrate, or by the calcium salts of the corresponding saturated or unsaturated fatty acid series, higher than formates. Nor need calcium salts necessarily be used. Obviously any of the alkaline or alkaline-earth salts capable of breaking down in the manner of calcium acetate and of reacting with the sulphur in the lignite may be used. However, it is found in practice, for reasons not entirely clear, that the highest yields of low boiling hydrocarbons free of sulphur are obtained with calcium acetate itself.

What I claim is:

1. The method for deriving low-boiling point liquid hydrocarbons from coals of the group represented by the class consisting of peat, lignite, and bituminous coal; which includes the steps of mixing the coal with an alkaline acetate, heating the mixture to a temperature corresponding to that of a low red heat, approximately from about 250° C. to about 500° C., so as to evolve vapors and produce coke, condensing the vapors evolved, and distilling the condensate.

2. The method for deriving low-boiling point liquid hydrocarbons from coals of the group represented by the class consisting of peat, lignite, and bituminous coal; which includes the steps of mixing the coal with an alkaline acetate, heating the mixture to a temperature corresponding to that of a low red heat, approximately from about 250° C. to about 500° C., so as to evolve vapors and produce coke, the heating being effected at a pressure below atmospheric, condensing the vapors evolved, and distilling the condensate.

3. The method for deriving low-boiling point liquid hydrocarbons from coals of the group represented by the class consisting of peat, lignite, and bituminous coal; which includes the steps of mixing the coal with an alkaline acetate, heating the mixture to a point in the neighborhood of about 100° C., subjecting the mixture thus heated to the action of steam, thereafter gradually raising the temperature of the mixture to a low red heat, approximately from about 250° C. to about 500° C., so as to evolve vapors and produce coke, the subjection of the mixture to the action of steam being continued during said gradual heating, condensing vapors evolved from the mixture during said gradual heating, and distilling the condensate.

4. The method for deriving low-boiling-point liquid hydrocarbons from lignite; which includes the steps of mixing lignite with calcium acetate, heating the mixture to a temperature corresponding to that of a low red heat, approximately from about 250° C. to about 500° C., so as to evolve vapors and produce coke, condensing the vapors evolved, and distilling the condensate.

5. The method for deriving low-boiling-point liquid hydrocarbons from lignite; which includes the steps of mixing lignite with calcium acetate, heating the mixture to a temperature corresponding to that of a low red heat, approximately from about 250° C. to about 500° C., so as to evolve vapors and produce coke, the heating being effected at a pressure below atmospheric, condensing the vapors evolved, and distilling the condensate.

6. The method for deriving low-boiling-point liquid hydrocarbons from lignite; which includes the steps of mixing lignite with calcium acetate in substantially the following proportions: 8 grams of calcium acetate to 1 kilogram of lignite, heating the mixture to a temperature corresponding to that of a low red heat, approximately from about 250° C. to about 500° C., so as to evolve vapors and produce coke, condensing the vapors evolved, and distilling the condensate.

7. The method for deriving low-boiling-point liquid hydrocarbons from sulphur-containing coals of the group represented by the class consisting of peat, lignite, and bituminous coal; which includes the steps of mixing the coal with calcium acetate in substantially the following proportions: 1 gram of calcium acetate for each percent of sulphur in the lignite, heating the mixture to a temperature corresponding to that of a low red heat, approximately from about 250° C. to about 500° C., so as to evolve vapors and produce coke, condensing the vapors evolved, and distilling the condensate.

8. The method for deriving low-boiling-point liquid hydrocarbons from lignite; which includes the steps of mixing lignite with calcium acetate, heating the mixture to a point in the neighborhood of about 100° C., subjecting the mixture thus heated to the action of steam, thereafter gradually raising the temperature of the mixture to a low red heat, approximately from about 250° C. to about 500° C., so as to evolve vapors and produce coke, the subjection of the mixture to the action of steam being continued during said gradual heating, condensing vapors evolved from the mixture during said gradual heating, and distilling the condensate.

GEORGES FRANCIS MICHOT-DUPONT.